| United States Patent [19] | [11] Patent Number: 4,670,514 |
| Burke | [45] Date of Patent: Jun. 2, 1987 |

[54] PRODUCTION OF HYDROLYZED POLYMALEIC ANHYDRIDE

[75] Inventor: Peter E. Burke, Timperley, England

[73] Assignee: Ciba-Geigy Corporation, Ardsley, N.Y.

[21] Appl. No.: 820,337

[22] Filed: Jan. 21, 1986

[30] Foreign Application Priority Data

Jan. 31, 1985 [GB] United Kingdom ................. 8502499

[51] Int. Cl.$^4$ ............................................... C08F 8/12
[52] U.S. Cl. ................................... 525/369; 525/327.7; 525/327.8; 525/329.6; 525/383; 526/210; 526/212; 526/271
[58] Field of Search .............. 525/327.7, 327.8, 329.6, 525/355, 369, 383; 526/271, 210, 212

[56] References Cited

U.S. PATENT DOCUMENTS

| 3,810,834 | 5/1974 | Jones et al. ............................ 210/58 |
| 3,919,258 | 11/1975 | Richardson et al. ......... 260/346.8 R |
| 4,212,788 | 7/1980 | Birrell et al. ......................... 526/271 |
| 4,260,724 | 4/1981 | Perner et al. ....................... 526/271 |

*Primary Examiner*—Joseph L. Schofer
*Assistant Examiner*—Bernard Lipman
*Attorney, Agent, or Firm*—Harry Falber

[57] ABSTRACT

The invention provides a process for the production of hydrolyzed polymaleic anhydride which comprises heating a reaction mixture comprising (a) maleic anhydride, (b) a reactive aromatic solvent, (c) an alcohol or glycol having up to 4 carbon atoms or esters of such an alcohol or glycol with maleic acid, and (d) di-tertiary butyl peroxide, and then hydrolyzing the resulting polymer.

12 Claims, No Drawings

PRODUCTION OF HYDROLYZED POLYMALEIC ANHYDRIDE

The present invention relates to the production of hydrolysed polymaleic anhydride by polymerisation of maleic anhydride followed by hydrolysis of the resulting polymer.

It is known that maleic anhydride can be homopolymerised to give polymers of various molecular weights, several methods of polymerisation having been described in the literature. The known methods involve the use of severe conditions such as radioactive irradiation, the use of large amounts of catalyst and/or high temperatures.

We have now surprisingly found that if an alcohol or glycol is added to the reaction mixture before polymerisation, the amount of catalyst needed to produce a given yield of product can be significantly reduced. In most cases the reduction is about 50%.

Accordingly the present invention provides a process for the production of hydrolysed polymaleic anhydride having a molecular weight of up to 3000, which comprises heating a reaction mixture comprising (a) maleic anhydride, (b) a reactive aromatic solvent, (c) an alcohol or glycol having up to 4 carbon atoms or ester of such an alcohol or glycol with maleic acid, and (d) di-tertiary butyl peroxide, and then hydrolysing the resulting polymer.

Suitable alcohols include methanol, ethanol, propanol and isobutanol. Suitable glycols include ethylene glycol, 1,2-propylene glycol and 1,3-butylene glycol. Preferably methanol is used either as the alcohol itself or as dimethyl maleate.

The reactive aromatic solvent may be, for example, xylene, a trimethyl benzene such as pseudo-cumene, or ethyl benzene or a mixture thereof. The preferred solvent is xylene, especially a commercial xylene which may contain up to 30% ethyl benzene. Commercial xylene, which is used in the Examples herein, has the following composition:
p-xylene 10.8–26.2% by weight
m-xylene 50.8–55.0% by weight
o-xylene 3.5–16.6% by weight
ethyl benzene 12.7–22.2% by weight The ratio of maleic anhydride to aromatic solvent in the reaction mixture may range from 1:1 to 1:3, preferably 1:1 to 1:2 by weight.

The molar ratio of alcohol or glycol to maleic anhydride may be from 0.5:2 to 1.2:2, preferably from 0.9:2 to 1.1:2.

The amount of di-tertiary butyl peroxide may be from 7.5% to 40% by weight based on the maleic anhydride, preferably from 7.5 to 20% by weight and most preferably from 10 to 20% by weight. Although amounts of up to 40% may be used, there is normally no need to use amounts above 20% as the yield of product is usually satisfactory with the use of up to 20% catalyst.

The di-tertiary butyl peroxide may be added slowly over a period of time of, for example up to 5 hours. The addition is preferably made to a mixture of maleic anhydride, solvent and alcohol, glycol or ester which is at the reaction temperature. The polymerisation reaction may be carried out at an elevated temperature of, for example, 120° to 145° C., preferably from 130° to 145° C.

After the catalyst has been added, the reaction mixture may be kept at the reaction temperature to complete the polymerisation. This is usually complete after about 1 hour.

When the polymerisation is complete the polymer may be hydrolysed with water, an acid, e.g. a mineral acid or an alkali e.g. an alkali metal hydroxide, preferably water. During the hydrolysis, the anhydride groups are reacted to form the acid groups. The solvent can be removed by steam distillation.

The polymer which is obtained by the process of the present invention has a molecular weight in the range of from 300 to 3000, preferably 300 to 2000, when measured in a dioxan or 2-butanone solution by a vapour pressure osmometer.

Polymaleic anhydride or derivatives thereof are useful for a number of important purposes. For example, polymaleic acid and especially the water-soluble salts thereof exhibit threshold and crystal modifying effects which can be utilised in the control of scale, such as that which forms in boilers, evaporators and industrial cooling plants. They also show special utility as chemical intermediates, as additives to other polymer systems and as corrosion inhibitors for metal surfaces, particularly in the presence of zinc salts. They may also be used as detergent builders.

The invention is illustrated by the following Examples in which "parts" are by weight.

EXAMPLE 1

200 parts (2.041 mole) maleic anhydride, 30 parts (0.938 mole) methanol and 232 parts (2.189 mole) commercial xylene are heated to reflux with stirring and 33 parts (0.226 mole) di t-butyl peroxide are added over 2.5 hours to the refluxing mixture. The reaction mass is then refluxed for 1 hour before being cooled to 90° C. and hydrolysed with 350 parts (19.44 mole) warm water. The unreacted xylene is steam distilled and the product adjusted to give a 47% w/w–53% w/w aqueous solution. The solution contains 241 parts polymer having a weight average molecular weight of 670.

Comparison

When the above process is repeated in the absence of methanol and using 66 parts (0.452 mole) di-t-butyl peroxide, the resulting solution contains 236 parts polymer having a weight average molecular weight of 780.

EXAMPLE 2

200 parts (2.041 mole) maleic anhydride, 77.6 parts (1.021 mole) 1,2-propylene glycol and 232 parts (2.189 mole) commercial xylene are heated to reflux with stirring and 33 parts (0.226 mole) di t-butyl peroxide are added over 2.5 hours at the reflux. The mass is refluxed for 1 hour further before being cooled and hydrolysed as in Example 1. The resulting solution contains 258 parts polymer having a weight average molecular weight of 1800.

EXAMPLE 3

200 parts (2.041 mole) maleic anhydride, 69.4 parts (0.94 mole) iso butanol and 232 parts (2.189 mole) commercial xylene are heated to reflux with stirring and 33 parts (0.226 mole) di t-butyl peroxide are added over 2.5 hours at the reflux. The reaction mass is maintained at the reflux for 1 hour further before being cooled and hydrolysed as in Example 1. The resulting solution contain 322 parts polymer having a weight average molecular weight of 800.

EXAMPLE 4

200 parts (2.041 mole) maleic anhydride, 30 parts (0.938 mole) methanol and 232 parts (2.189 mole) commercial xylene are heated to reflux (142°–144° C.) with stirring and 66 parts (0.452 mole) di-tertiary butyl peroxide are added over 5 hours to the refluxing mixture. The reaction mass is then refluxed for 1 hour before being cooled to 90° C. and hydrolysed as described in Example 1. The resulting solution contains 274 parts polymer having a weight average molecular weight of 680.

EXAMPLE 5

194.6 parts (1.986 mole) maleic anhydride, 8.7 parts (0.06 mole) dimethyl maleate and 232 parts (2.189 mole) commercial xylene are heated to reflux with stirring and 33 parts (0.226 mole) di t-butyl peroxide are added over 2.5 hours at the reflux. The reaction mass is refluxed for 1 hour further before being cooled and hydrolysed as in Example 1. The resulting solution contains 232 parts polymer having a weight average molecular weight of 665.

EXAMPLE 6

Example 1 is repeated except that 26.4 parts (0.18 mole) di t-butyl peroxide are added over 2 hours to the refluxing mixture. The resulting solution contains 204 parts polymer having a weight average molecular weight of 660.

EXAMPLE 7

189 parts (1.1929 mole) maleic anhydride, 16.2 parts (0.112 mole) dimethyl maleate and 232 parts (2.189 mole) commercial xylene are heated to reflux with stirring and 23.1 parts (0.158 mole) di-t-butyl peroxide are added over 1.75 hours to the refluxing mixture. The reaction mass is refluxed for 1 hour further before being cooled and hydrolysed. The resulting solution contains 234 parts polymer having a weight average molecular weight of 680.

EXAMPLE 8

200 parts (2.04 mole) maleic anhydride, 30 parts methanol (0.938 mole) and 232 parts cumene (1.93 mole) are charged to the flask and heated to 146° C. Agitation is commenced once the materials have dissolved. 33 parts (0.226 mole) of di t-butyl peroxide are added over 2.5 hours. The mass at the end of the addition is refluxed at 140° C. and is maintained for 1 hour at this temperature before being hydrolysed as in Example 1. The resulting solution contains 233 g of polymer having a weight average molecular weight of 667.

I claim:

1. A process for the production of hydrolysed polymaleic anhydride having a molecular weight of up to 3000 which comprises heating at a temperature of 120° to 145° C. a reaction mixture comprising (a) maleic anhydride, (b) a reactive aromatic solvent selected from the group consisting of xylene, a trimethyl benzene, ethyl benzene and mixtures thereof, (c) an alcohol or glycol having up to 4 carbon atoms or ester of such an alcohol or glycol with maleic acid, and (d) di-tertiary butyl peroxide, and then hydrolysing the resulting polymer; the weight ratio of maleic anhydride to aromatic solvent ranging from 1:1 to 1:3, the molar ratio of glycol to maleic anhydride ranging from 0.5:2 to 1.1:2, and the amount of di-tertiary butyl peroxide ranging from 7.5 to 40% by weight of maleic anhydride.

2. A process as claimed in claim 1 in which the molar ratio of alcohol or glycol to maleic anhydride is from 0.9:2 to 1.1:2.

3. A process as claimed in claim 1 in which the alcohol is methanol, ethanol, propanol or isobutanol.

4. A process as claimed in claim 1 in which the glycol is ethylene glycol, 1,2-propylene glycol or 1,3-butylene glycol.

5. A process as claimed in claim 1 in which the ester is dimethyl maleate.

6. A process as claimed in claim 1 in which the amount of di-tertiary butyl peroxide is from 7.5 to 20% by weight of maleic anhydride.

7. A process as claimed in claim 6 in which the amount of di-tertiary butyl peroxide is from 10 to 20% by weight of maleic anhydride.

8. A process as claimed in claim 1 in which the di-tetiary butyl peroxide is added slowly over a period of up to 2.5 hours.

9. A process as claimed in claim 1 in which the reactive aromatic solvent is xylene, pseudo-cumene, ethyl benzene or a mixture thereof.

10. A process as claimed in claim 9 in which the solvent is a commercial xylene containing up to 30% by weight of ethyl benzene.

11. A process as claimed in claim 1 in which the ratio of maleic anhydride to solvent is from 1:1 to 1:2 by weight.

12. A process as claimed in claim 1 in which the resulting product is hydrolysed by water, an acid or an alkali.

* * * * *